United States Patent [19]
Kostrzewa

[11] Patent Number: 5,906,138
[45] Date of Patent: May 25, 1999

[54] RACK YOKE

[75] Inventor: Michael J. Kostrzewa, Grosse Pointe Woods, Mich.

[73] Assignee: TRW Inc., Lyndhurst, Ohio

[21] Appl. No.: 08/998,242

[22] Filed: Dec. 24, 1997

[51] Int. Cl.⁶ .............. B62D 5/22; F16H 19/04; F16C 27/02
[52] U.S. Cl. .............. 74/498; 74/422; 384/37; 384/42
[58] Field of Search .............. 74/89.17, 422, 74/498; 384/37, 42

[56] References Cited

U.S. PATENT DOCUMENTS

| | | | |
|---|---|---|---|
| 3,747,429 | 7/1973 | Cass | 74/492 |
| 4,785,685 | 11/1988 | Kobayashi et al. | 74/498 |
| 4,800,770 | 1/1989 | Kobayashi et al. | 74/422 |
| 4,939,947 | 7/1990 | Toyoshima et al. | 74/422 |
| 5,622,085 | 4/1997 | Kostrzewa | 74/498 |

Primary Examiner—Allan D. Herrman
Attorney, Agent, or Firm—Tarolli, Sundheim, Covell, Tummino & Szabo

[57] ABSTRACT

A yoke (30) supports a rack (14) in a steering gear housing (12). The yoke (30) comprises a rolled and folded metal sheet (62) having a cylindrical configuration defining a side wall (50) and an end wall (52) of the yoke (30). The side wall (50) has a cylindrical contour which is complementary to a cylindrical inner surface (54) of the housing (12). The end wall (52) has a semi-cylindrical contour which is complementary to a semi-cylindrical surface portion (58) of the rack (14).

7 Claims, 2 Drawing Sheets

RACK YOKE

FIELD OF THE INVENTION

The present invention relates to a rack and pinion steering gear, and particularly relates to a yoke for supporting a rack in a rack and pinion steering gear.

BACKGROUND OF THE INVENTION

A rack and pinion steering gear has a housing containing a rack and a pinion. The rack has a longitudinally extending row of rack teeth in meshing engagement with helical gear teeth on the pinion. The opposite ends of the rack project outward from the housing, and are connected with a steering linkage and a corresponding pair of steerable vehicle wheels. The pinion is connected with the vehicle steering wheel by an input shaft and a torsion bar. When a steering maneuver is being performed, the pinion rotates, and the rack moves longitudinally. The housing also contains a spring-loaded yoke which presses the rack against the pinion to maintain the rack teeth in meshing engagement with the gear teeth on the pinion.

SUMMARY OF THE INVENTION

The present invention comprises a yoke for supporting a rack in a steering gear housing. In accordance with the present invention, the yoke comprises a rolled and folded metal sheet having a cylindrical configuration defining a side wall and an end wall of the yoke. The side wall has a cylindrical contour which is complementary to a cylindrical inner surface of the housing. The end wall has a semi-cylindrical contour which is complementary to a semi-cylindrical surface portion of the rack.

In a preferred embodiment of the present invention, the metal sheet is a one-piece structure. A side surface of the metal sheet is fully covered by low friction material. That side surface includes an outer surface of the cylindrical side wall, and also includes an outer surface of the semi-cylindrical end wall.

The preferred embodiment of the present invention further comprises a preload disk. The preload disk abuts an annular rear edge surface of the rolled and folded metal sheet. A spring is compressed between the preload disk and a closure cap which closes the housing. In this arrangement, the preload disk transmits a preloading force from the spring to the yoke.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
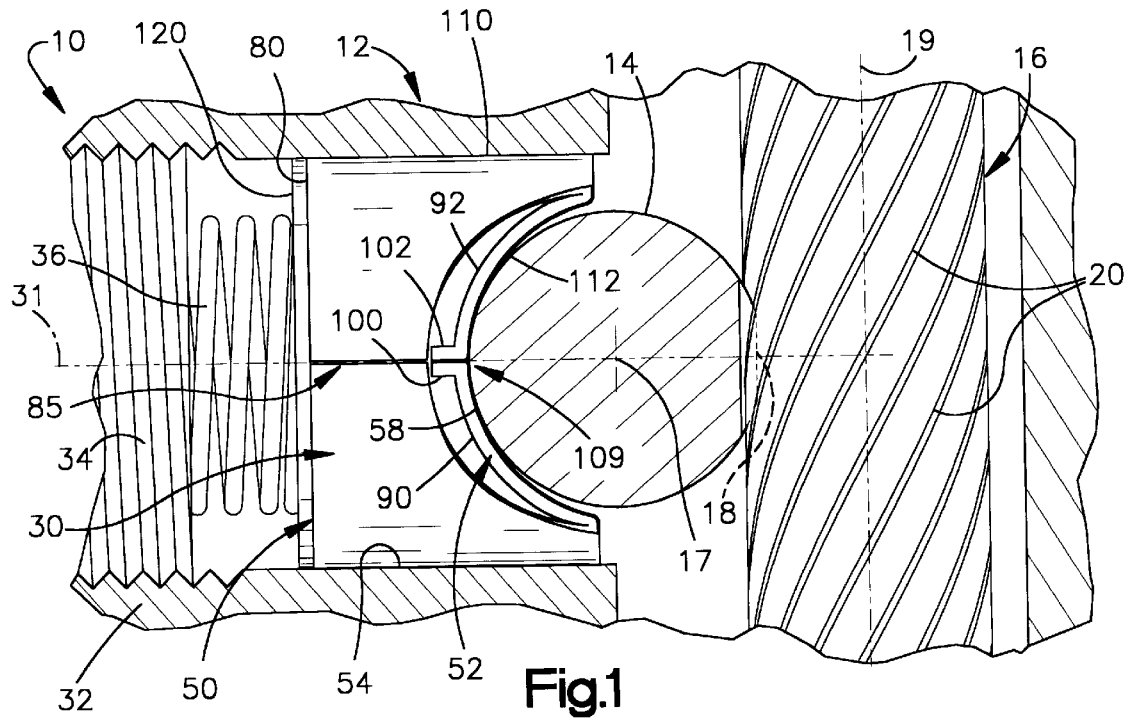
FIG. 1 is a partial view of an apparatus including a rack yoke comprising a preferred embodiment of the present invention.

An apparatus 10 comprising a preferred embodiment of the present invention is shown partially in FIG. 1. The apparatus 10 is a rack and pinion steering gear including a housing 12 containing a rack 14 and a pinion 16. The rack 14 has a longitudinal central axis 17 and an axially extending row of rack teeth 18. The pinion 16 has an axis of rotation 19, and has a helical gear teeth 20 in meshing engagement with the rack teeth 18. As known in the art, the opposite ends of the rack 14 are connected with a steering linkage and a corresponding pair of steerable vehicle wheels. The pinion 16 is connected with the vehicle steering wheel by an input shaft and a torsion bar. When a steering maneuver is being performed, the pinion 16 rotates about the axis 19, and the rack 14 moves longitudinally along the axis 17.

The steering gear 10 further includes a yoke 30. The yoke 30 is a cylindrical part centered on an axis 31 perpendicular to the axis 17 of the rack 14. As further shown in FIG. 1, the yoke 30 is contained in a cylindrical section 32 of the housing 12 between a closure cap 34 and the rack 14. A spring 36 is compressed between the yoke 30 and the closure cap 34. The spring 36 applies an axially directed preloading force which urges the yoke 30 forcefully against the rack 14 in a direction extending from left to right, as viewed in FIG. 1. The yoke 30, in turn, applies the preloading force to the rack 14 so as to hold the rack teeth 18 firmly in mesh with the teeth 20 on the pinion 16.

Figure 2:
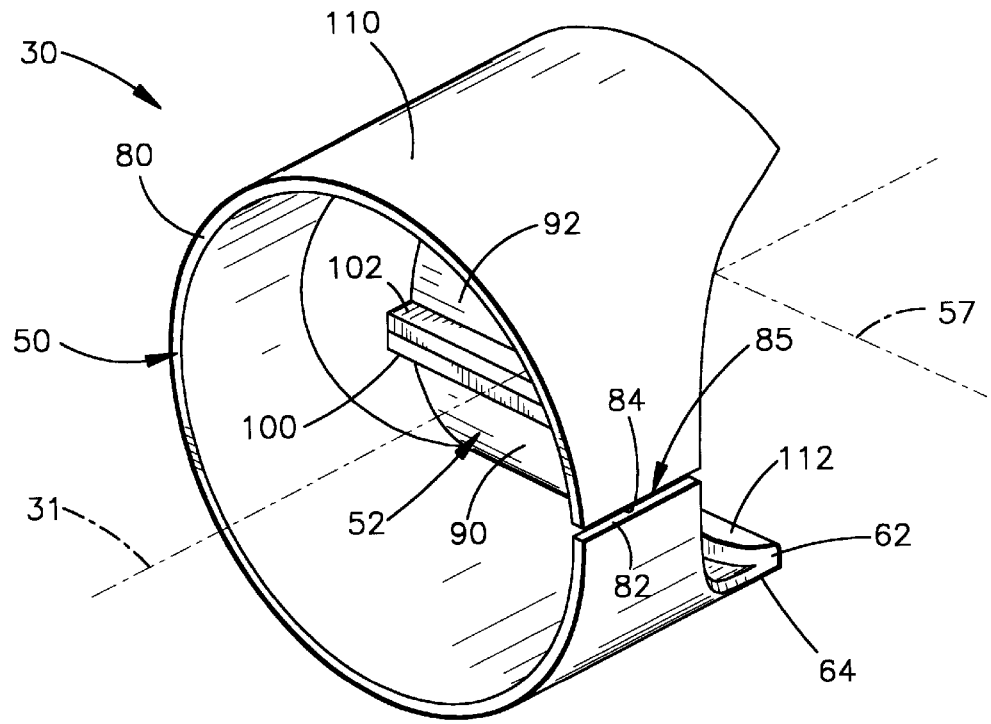
FIGS. 2 and 3 are perspective views of the yoke of FIG. 1.
Figure 3:
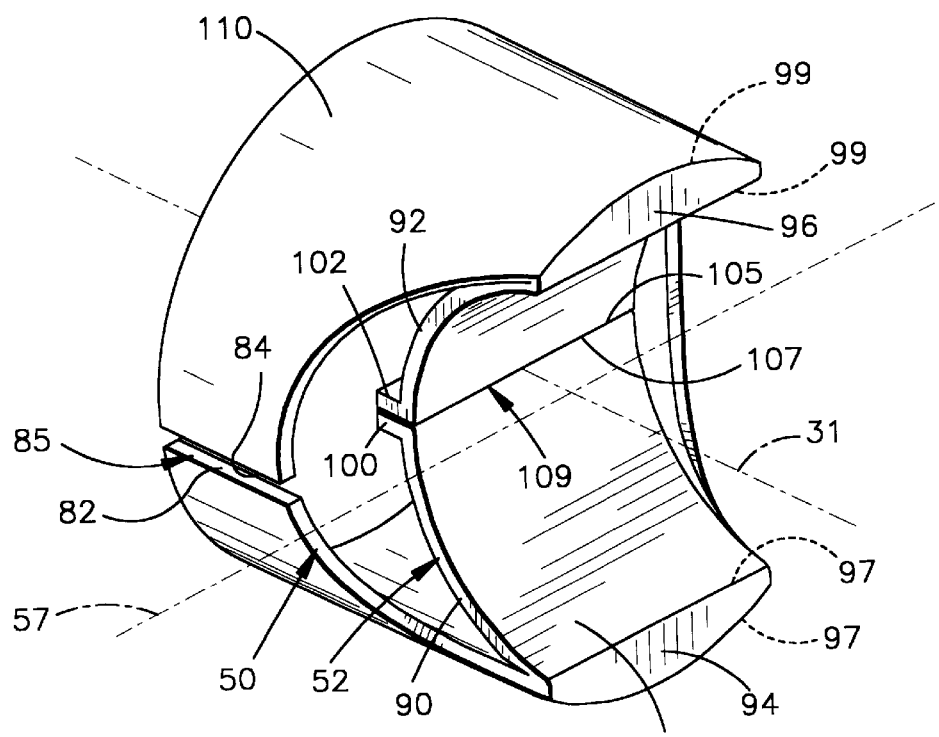

As shown separately in FIGS. 2 and 3, the yoke 30 has a side wall 50 and an end wall 52. The side wall 50 has a cylindrical contour centered on the axis 31. As indicated in FIG. 1, the cylindrical contour of the side wall 50 is complementary to the cylindrical contour of an inner surface 54 of the housing 12. The end wall 52 of the yoke 30 has a semi-cylindrical contour centered on an axis 57 perpendicular to the axis 31. The semi-cylindrical contour of the end wall 52 is complementary to a semi-cylindrical surface portion 58 (FIG. 1) of the rack 14.

Figure 4:
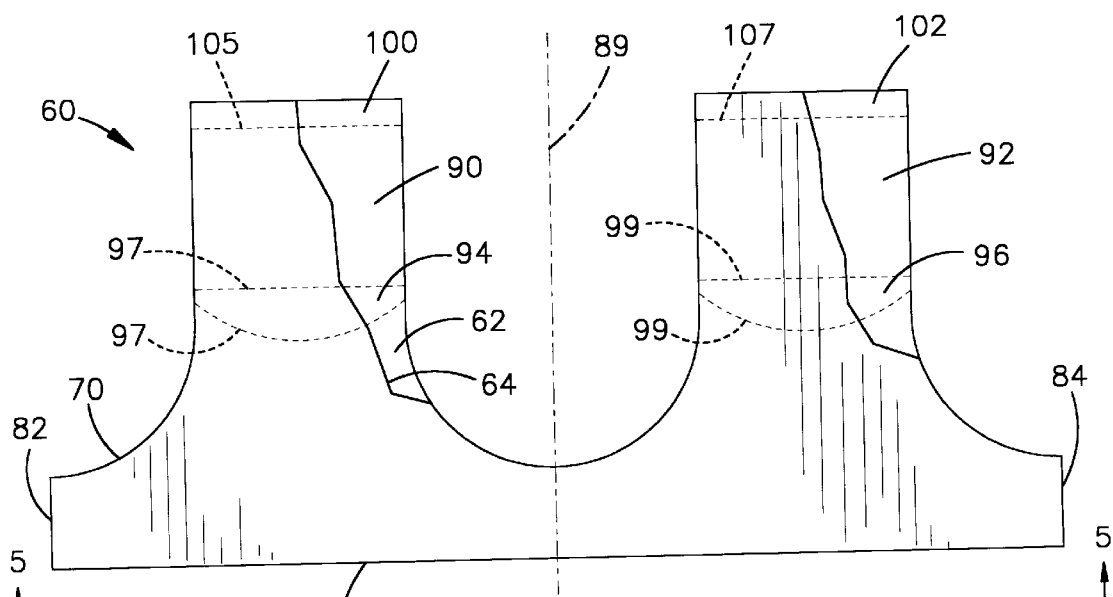
FIG. 4 is a plan view of a part used to form the yoke of FIG. 1.
Figure 5:
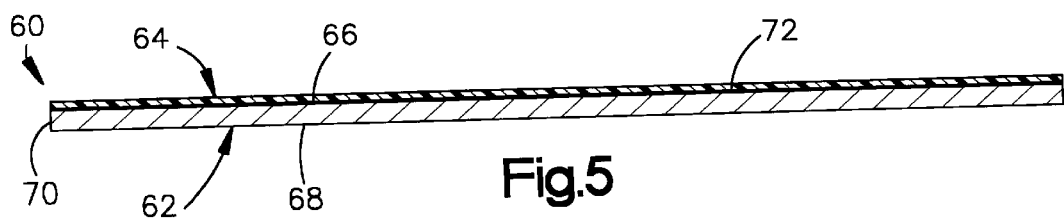
FIG. 5 is a view taken on line 5—5 of FIG. 4.

FIGS. 4 and 5 show a laminated panel 60 that is used to form the yoke 30 of FIGS. 1–3. The panel 60 comprises a metal sheet 62 with an overlying layer 64 of low friction material. The metal sheet 62 in the preferred embodiment of the present invention is a one-piece structure. By "one-piece" is meant that the metal sheet 62 is made from a single homogenous material, and is a single unit exclusive of separate but joined elements. Preferred materials for the metal sheet 62 include copper, brass and steel.

The metal sheet 62 has opposite side surfaces 66 and 68 bounded by a peripheral edge surface 70. The layer 64 of low friction material extends uniformly and fully over one side surface 66 of the metal sheet 62, and is fixed to that side surface 66 by an adhesive bond 72. Preferably, the layer 64 of low friction material is formed of Teflon®, a trademark of E. I. DuPont de Nemours and Co. of Wilmington, Del.

The panel 60 of FIGS. 4 and 5 is configured such that the metal sheet 62 will define the side wall 50 and the end wall 52 of the yoke 30 when the panel 60 has been rolled and folded in a predetermined manner. Specifically, the peripheral edge surface 70 of the metal sheet 62 has an elongated rear portion 80 extending between a pair of relatively short, parallel opposite side portions 82 and 84. When the panel 60 has been rolled and folded, the rear portion 80 of the edge surface 70 defines an annular rear edge of the cylindrical side wall 50, as best shown in FIG. 2. The opposite side portions 82 and 84 of the edge surface 70 are located beside each other to define an open seam 85 which is parallel to the axis 31 of the side wall 50.

A pair of rectangular sections 90 and 92 of the metal sheet 62 are located on opposite sides of a centerline 89 (FIG. 4). When the panel 60 has been rolled and folded, those sections 90 and 92 of the metal sheet 62 define respective segments of the semi-cylindrical end wall 52, as best shown in FIGS. 1 and 3. The segments 90 and 92 of the end wall 52 are joined with the side wall 50 by a pair of intermediate portions 94 and 96 of the metal sheet 62 which are folded about corresponding pairs of fold lines 97 and 99.

As further shown in FIG. 4, the metal sheet 62 has a pair of rectangular edge sections 100 and 102 projecting from the rectangular wall sections 90 and 92. The edge sections 100 and 102 are folded about corresponding fold lines 105 and 107, and abut each other to define a closed seam 109 (FIGS. 1–3) extending across the middle of the end wall 52. The panel 60 can be rolled and folded into the configuration of the yoke 30 by the use of any suitable swaging or other metal shaping process and apparatus known in the art.

As noted above, the layer 64 of low friction material extends fully over the side surface 66 of the metal is sheet 62. The layer 64 thus extends over the side wall 50 to define a cylindrical side surface 110 of the yoke 30. The layer 64 also extends over the end wall 52 to define a semi-cylindrical end surface 112 of the yoke 30.

When the yoke 30 is being installed in the housing 12 of FIG. 1, the open seam 85 enables the side wall 50 to contract so that the yoke 30 can be fitted closely within the cylindrical section 32 of the housing 12. A preload disk 120 is then placed against the annular rear edge surface 80 of the side wall 50. The disk 120 applies the preloading force of the spring 36 to the rear edge surface 80 when the spring 36 is compressed axially between the closure cap 34 and the disk 120. This presses the end wall 52 of the yoke 30 against the rack 14. More specifically, the preloading force of the spring 36 presses the semi-cylindrical end surface 112 of the yoke 30 against the semi-cylindrical surface portion 58 of the rack 14. The low friction material at the end surface 112 facilitates sliding movement of the rack 14 against the yoke 30 during operation of the steering gear 10. Additionally, the low friction material at the cylindrical side surface 110 of the yoke 30 facilitates sliding movement of the yoke 30 within the cylindrical housing section 32, as needed, during operation of the steering gear 10.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for supporting a rack in a steering gear housing, said apparatus comprising:

a yoke comprising a rolled and folded metal sheet having a cylindrical configuration defining a side wall and an end wall of said yoke, said side wall having a cylindrical contour complementary to a cylindrical inner surface of the housing, said end wall having a semi-cylindrical contour complementary to a semi-cylindrical surface portion of the rack.

2. Apparatus as defined in claim 1 wherein said rolled and folded metal sheet has a side surface which is fully covered by low friction material, said side surface including a cylindrical outer surface of said side wall and a semi-cylindrical outer surface of said end wall.

3. Apparatus as defined in claim 1 wherein said rolled and folded metal sheet is a one-piece structure.

4. Apparatus as defined in claim 1 wherein said rolled and folded metal sheet has an annular rear edge surface, said apparatus further comprising a preload disk abutting said rear edge surface and a spring applying a preloading force to yoke through said disk.

5. Apparatus for supporting a rack in a steering gear housing, said apparatus comprising:

a metal sheet having a configuration which, when rolled and folded in a predetermined manner, defines a cylindrical yoke structure having a side wall and an end wall, said side wall having a cylindrical contour complementary to a cylindrical inner surface of the housing, said end wall having a semi-cylindrical contour complementary to a semi-cylindrical surface portion of the rack.

6. Apparatus as defined in claim 5 wherein said metal sheet has a side surface which is fully covered by low friction material.

7. Apparatus as defined in claim 5 wherein said metal sheet is a one-piece structure.

* * * * *